US008902738B2

(12) United States Patent
Boggala et al.

(10) Patent No.: US 8,902,738 B2
(45) Date of Patent: Dec. 2, 2014

(54) DYNAMICALLY ADJUSTING ACTIVE MEMBERS IN MULTICHASSIS LINK BUNDLE

(75) Inventors: Mallikarjuna R. Boggala, Cary, NC (US); Chun Zhang, Cary, NC (US); Shishir Gupta, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 25 days.

(21) Appl. No.: 13/343,095

(22) Filed: Jan. 4, 2012

(65) Prior Publication Data

US 2013/0170340 A1   Jul. 4, 2013

(51) Int. Cl.
*H04L 12/28* (2006.01)
*H04L 12/26* (2006.01)

(52) U.S. Cl.
CPC ........ *H04L 12/2863* (2013.01); *H04L 12/2639* (2013.01)
USPC ...................................................... 370/228

(58) Field of Classification Search
CPC ............ H04L 12/2416; H04L 12/2477; H04L 12/2602; H04L 12/2639; H04L 12/2671; H04L 12/2863; H04L 12/401136; G05B 2219/31242
USPC ...................................................... 370/228
See application file for complete search history.

(56) References Cited

U.S. PATENT DOCUMENTS

| 2003/0105854 | A1* | 6/2003 | Thorsteinsson et al. ....... 709/223 |
| 2011/0110382 | A1  | 5/2011 | Jabr et al. |
| 2011/0182179 | A1* | 7/2011 | Alesi et al. .................... 370/230 |
| 2011/0206058 | A1  | 8/2011 | Elsen et al. |
| 2011/0211585 | A1* | 9/2011 | Kodaka et al. ................ 370/401 |
| 2011/0229126 | A1* | 9/2011 | Gerstel ............................ 398/25 |
| 2012/0201135 | A1  | 8/2012 | Ding et al. |
| 2012/0281541 | A1  | 11/2012 | Palmer et al. |

OTHER PUBLICATIONS

"IEEE Standard for Local and metropolitan area networks—Link Aggregation," IEEE Std 802.1AX—2008, IEEE, New York, NY, Nov. 3, 2008 (163 pages).
"High Scale Data Center Interconnect—LAN Extension Using MC-LAG to VPLS on the Cisco ASR-9000," Cisco Systems, Inc., San Jose, CA, Jul. 11, 2011 (seventy-two pages).
Multichassis LACP, Cisco Systems, Inc., San Jose, CA, Feb. 8, 2011 (fifty-eight pages).

* cited by examiner

*Primary Examiner* — Mark Rinehart
*Assistant Examiner* — Ellen A Kirillova
(74) *Attorney, Agent, or Firm* — The Law Office of Kirk D. Williams

(57) ABSTRACT

In one embodiment, active links are added to, and removed from, a multichassis link bundle with one side of the multichassis link bundle terminated on multiple devices of a multichassis device. In one embodiment, adding active links includes selecting which particular device to which to add an active link to the multichassis link bundle based on a device priority of each of the multiple devices, with a device priority of a given device being based on a current number of active links associated with the given device.

21 Claims, 3 Drawing Sheets

DYNAMICALLY ADJUSTING ACTIVE MEMBERS IN MULTICHASSIS LINK BUNDLE

TECHNICAL FIELD

The present disclosure relates generally to forwarding packets between packet switching devices over a link bundled interface.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Reliably communicating information in a network is important. Service providers and enterprise customers may require deploying network redundancy. One of the network redundancy solutions consists of deploying a cluster at the edge of the network, so that provider edge system has redundant connections to customer edge network. In a cluster system, multiple independent packet switching systems operate as a single logical packet switching system.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1:
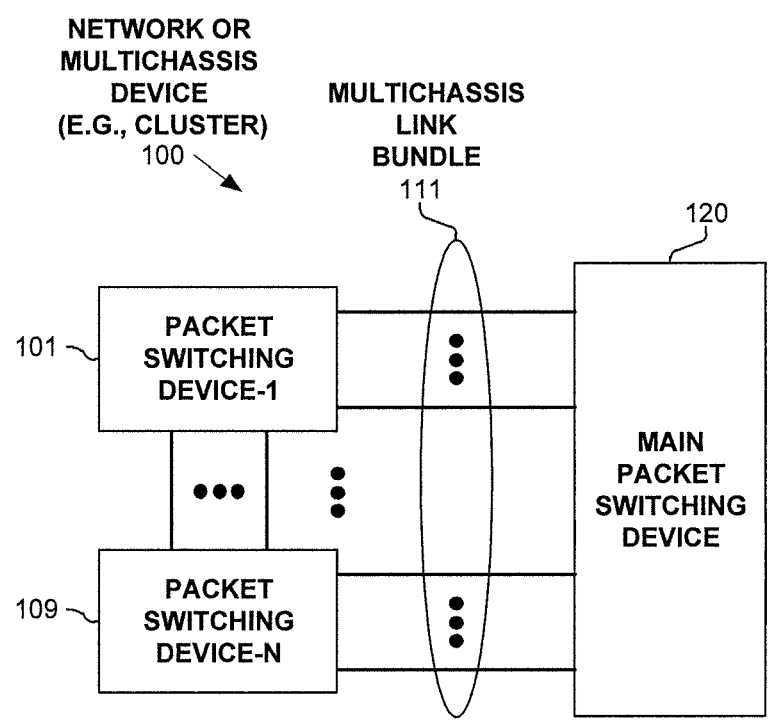
FIG. 1 illustrates a network according to one embodiment.

Disclosed are, inter alia, methods, apparatus, computer-storage media, mechanisms, and means associated with dynamically adjusting active members in multichassis link bundle. One embodiment performs operations, including: adding and removing active links to and from a multichassis link bundle with one side of the multichassis link bundle terminated on a plurality of devices of a multichassis device; wherein said adding active links includes selecting which particular device of the plurality of devices to which to add an active link to the multichassis link bundle based on a device priority of each of the plurality of devices; and wherein a device priority of a given device is based on a current number of active links associated with the given device.

In one embodiment, the device priority for the given device is based on a weighted value associated with the given device and the current number of active links associated with the given device; and wherein at least one of the plurality of devices has a different weighted value than another of the plurality of devices. In one embodiment, at least said weighted value associated with one of the plurality of devices is greater than one. One embodiment includes: selecting an identifiable device of the plurality of devices to which to remove an active link from the multichassis link bundle based on the device priority, and in response, removing an active link terminating on the identifiable device from the multichassis link bundle. In one embodiment, the plurality of devices includes at least three devices. In one embodiment, said adding and removing active links is performed in a manner to distribute the active links terminating on the plurality of devices in a weighted even distribution manner across the plurality of devices.

In one embodiment, said adding and removing active links includes: in response to a particular link becoming available to add to the multichassis link bundle: identifying a lower device priority active link currently active in the multichassis link bundle with the lower device priority active link associated with one of the plurality of devices having a lower said device priority than the device priority of the device of the plurality of devices terminating the particular link, removing the lower device priority active link from the multichassis link bundle, and adding the particular link to the multichassis link bundle. In one embodiment, said operation of identifying a lower device priority active link currently active in the multichassis link bundle is performed by considering device priorities as if the lower device priority active link is not active in the multichassis link bundle.

One embodiment includes selecting an identifiable device of the plurality of devices to which to remove an active link from the multichassis link bundle based on the device priority. In one embodiment, the plurality of devices includes at least three devices. In one embodiment, said adding and removing active links is performed in a manner to evenly distribute the active links terminating on the plurality of devices.

2. Description

Disclosed are, inter alia, methods, apparatus, computer-storage media, mechanisms, and means associated with dynamically adjusting active members in multichassis link bundle. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, or other implementation for performing the corresponding processing. The embodiments described hereinafter embody various aspects and configurations, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the embodiments. Note, the term "apparatus" is used consistently herein with its common definition of an appliance or device.

Note, the steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value - the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

FIG. 1 illustrates one embodiment including a network or multichassis device (e.g., cluster) 100, which includes two or more packet switching devices 101-109 and main packet switching device 120. Each of packet switching devices 101-109 terminate on one or more links of multichassis link bundle 111, with the other end of the links of the multichassis link bundle 111 terminated on main packet switching device 120.

As used herein, a multichassis bundle refers to multiple links which are bundled together, and typically appear as a single logical interface to higher-layer protocols. Further, the multichassis bundle includes one end that terminates on a single device, and a second end of different links of the multichassis bundle that terminate on multiple different devices.

Typically, links of the multichassis link bundle 111 will include active and standby links, where active links are used for communicating data packets, while standby links are available to replace active links in cases including, for example, failure of an active link, degradation an active link, an active link being taken out of service, etc. A configuration parameter of a multichassis link bundle 111 typically includes a maximum number of links to be active at any time. Thus, if the number of currently active links in a multichassis link bundle 111 is greater than the maximum number of active links, then some of the available links need to be allocated as standby inactive links in some manner.

One embodiment uses a device priority associated with each of packet switching devices 101-109 for use in defining the active links of multichassis link bundle 111. One embodiment uses the device priority to allocate the active links of multichassis link bundle 111 among packet switching devices 101-109, and then uses a secondary mechanism to determine which particular links of the multiple links associated with each of packet switching devices 101-109 to make active. For example, one embodiment uses parameters used in Link Aggregation Control Protocol (LACP) (and possibly LACP itself) to determine which particular links of the multiple links associated with each of packet switching devices 101-109 to make active. One embodiment uses a port priority and/or a port identifier associated with each link of the links of multichassis link bundle 111 of a particular packet switching device (101-109) to determine which particular links of the links associated with the particular packet switching device (101-109) to make active.

One embodiment typically uses a device priority for each of packet switching devices 101-109 based on the current number of active links of multichassis link bundle 111 being terminated on that particular packet switching device. In one embodiment, the device priority is the number of active links associated with a device. In one embodiment, the device priority is one over the number of active links associated with a device.

One embodiment allocates the active links in order to evenly distribute the active links of multichassis link bundle 111 among packet switching devices 101-109. For example, if there are three packet switching devices with two devices each having two active links and the third having three active links, one embodiment would add an active link to one of the two devices currently having two active links based the device priority (e.g., some value based on the number of active links associated with a device) in order to evenly allocate the active links among the devices. In one embodiment a port priority and/or a port identifier associated with links is used in determining to which of multiple devices having a same device priority to add or remove an active link to the multichassis link bundle 111.

When all or at least multiple packet switching devices 101-109 have a same device priority, one embodiment uses a secondary mechanism to determine which particular links of the multiple links associated with each of packet switching devices 101-109 to make active. One embodiment uses parameters used in Link Aggregation Control Protocol (LACP) (and possibly LACP itself) to determine which particular links of the multiple links associated with each of packet switching devices 101-109 to make active. One embodiment uses a port priority and/or a port identifier associated with each link of the links of multichassis link bundle 111 to determine which particular links of the multiple links associated with each of packet switching devices 101-109 to make active when the device priorities are the same. One embodiment first uses a port priority as a second-level determination, and then port identifier as a third-level determination when identifying which particular links of the links associated with each of packet switching devices 101-109 to make active.

One embodiment uses a device priority for each of packet switching devices 101-109 based on the current number of active links of multichassis link bundle 111 being terminated on that particular packet switching device as well as a weighted value associated with each of packet switching devices 101-109. For example, weighted values can be used to provide a ratio or other comparison mechanism for dynamically distributing the active links of multichassis link bundle 111 among packet switching devices 101-109. For example, traffic engineering may determine that it is advantageous to distribute the active links of multichassis link bundle 111 in a non-equal fashion (e.g., weighted-even distribution) among packet switching devices 101-109. In one embodiment, the device priority is the weighted value associated with a device divided by the current number of active links associated with the device. For example, if one packet switching device has a weighted value of two and another packet switching device has a weighted value weighted distribution of three, the allocation of active links will target a 2:3 ratio among these two packet switching devices.

In one embodiment, the device priority is a static defined priority value, such as, but not limited to, a value defining a strict priority order.

Figure 2A:
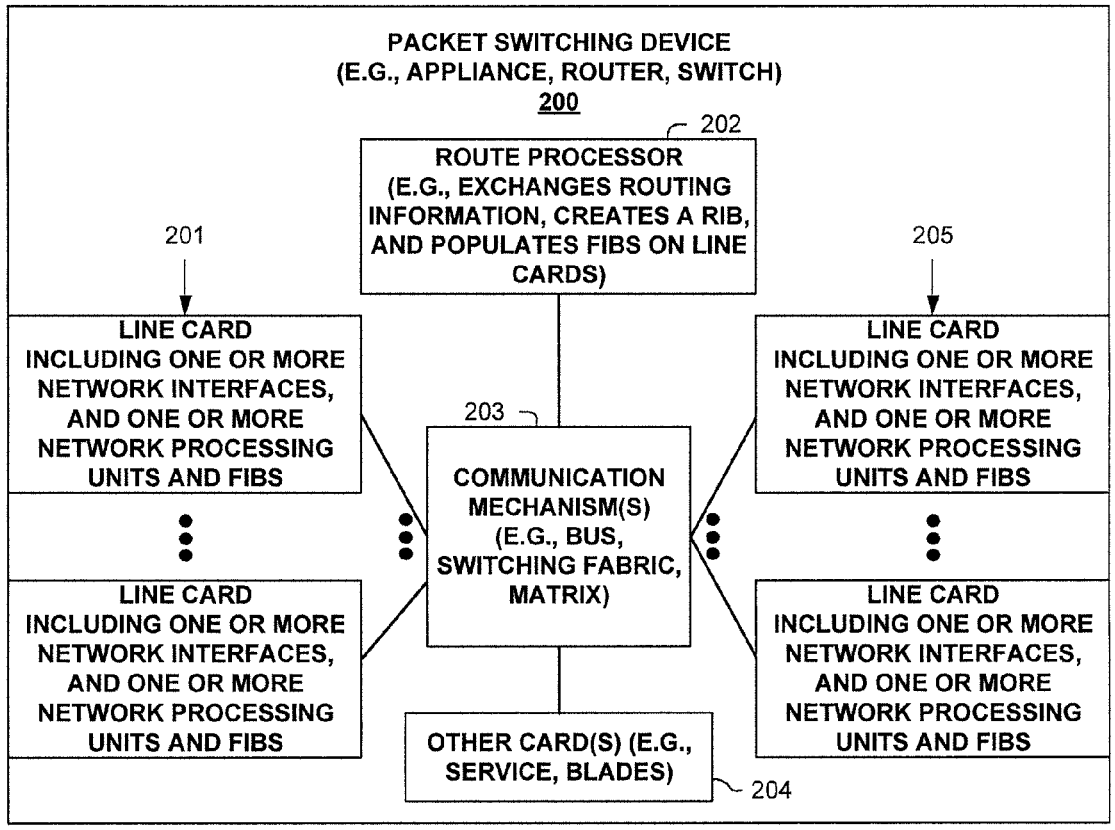
FIG. 2A illustrates a packet switching device according to one embodiment.

One embodiment of packet switching device 200 (e.g., appliance, router, switch bridge) is illustrated in FIG. 2A. As shown, packet switching device 200 includes multiple line cards 201 and 205, each with one or more network interfaces for termination communications links (e.g., possibly part of a multichassis bundle), one or more network processing units, and FIBs for use in forwarding packets. Additionally, packet switching device 200 also has a route processor 202, which typically manages the control plane by communicating routing information with other packet switching devices, populates one or more RIBs, and populates one or more FIBs in line cards 201 and 205. Packet switching device 200 also includes other cards 204 (e.g., service cards, blades), and some communication mechanism 203 (e.g., bus, switching fabric, matrix) for allowing its different entities 201, 202, 204 and 205 to communicate. Note, as used herein, a network processing unit refers to a network processor and memory for use in processing (e.g., including forwarding) of packets. A line card can have a single network processing unit, or may have multiple network processing units.

Figure 2B:
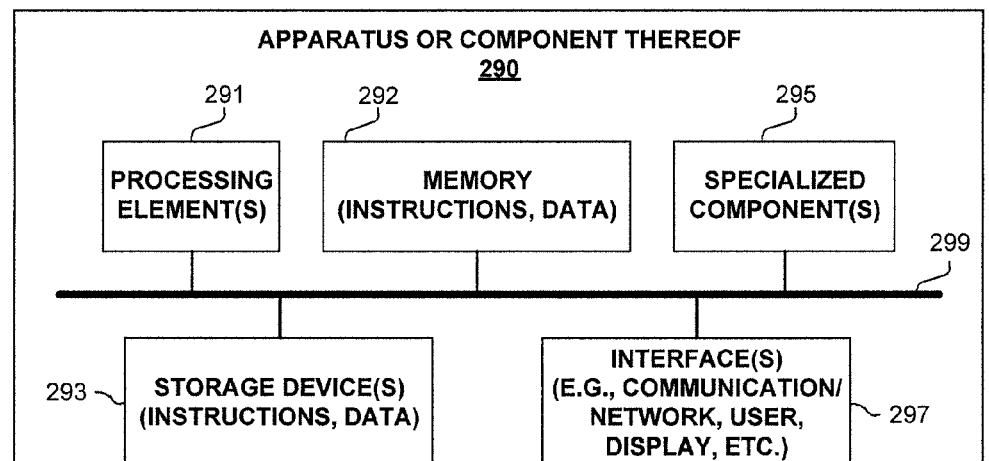
FIG. 2B illustrates an apparatus or component configured to operate, and/or operating, according to one embodiment.

FIG. 2B is a block diagram of an apparatus or component 290 used in one embodiment associated with dynamically adjusting active members in multichassis link bundle. In one embodiment, apparatus or component 290 performs one or more processes corresponding to one of the flow diagrams illustrated or otherwise described herein, and/or illustrated in another diagram or otherwise described herein.

In one embodiment, apparatus or component 290 includes one or more processing element(s) 291, memory 292, storage device(s) 293, specialized component(s) 295 (e.g. optimized hardware such as for performing operations, etc.), and interface(s) 297 for communicating information (e.g., sending and receiving packets over links of a multichassis bundle, user-interfaces, displaying information, etc.), which are typically communicatively coupled via one or more communications mechanisms 299, with the communications paths typically tailored to meet the needs of a particular application. In one embodiment apparatus or component 290 corresponds to, or is part of, packet switching device 101-109 and/or 120 of FIG. 1.

Various embodiments of apparatus or component 290 may include more or fewer elements. The operation of apparatus or component 290 is typically controlled by processing element(s) 291 using memory 292 and storage device(s) 293 to perform one or more tasks or processes. Memory 292 is one type of computer-readable/computer-storage medium, and typically comprises random access memory (RAM), read only memory (ROM), flash memory, integrated circuits, and/or other memory components. Memory 292 typically stores computer-executable instructions to be executed by processing element(s) 291 and/or data which is manipulated by processing element(s) 291 for implementing functionality in accordance with an embodiment. Storage device(s) 293 are another type of computer-readable medium, and typically comprise solid state storage media, disk drives, diskettes, networked services, tape drives, and other storage devices. Storage device(s) 293 typically store computer-executable instructions to be executed by processing element(s) 291 and/or data which is manipulated by processing element(s) 291 for implementing functionality in accordance with an embodiment.

Figure 3:
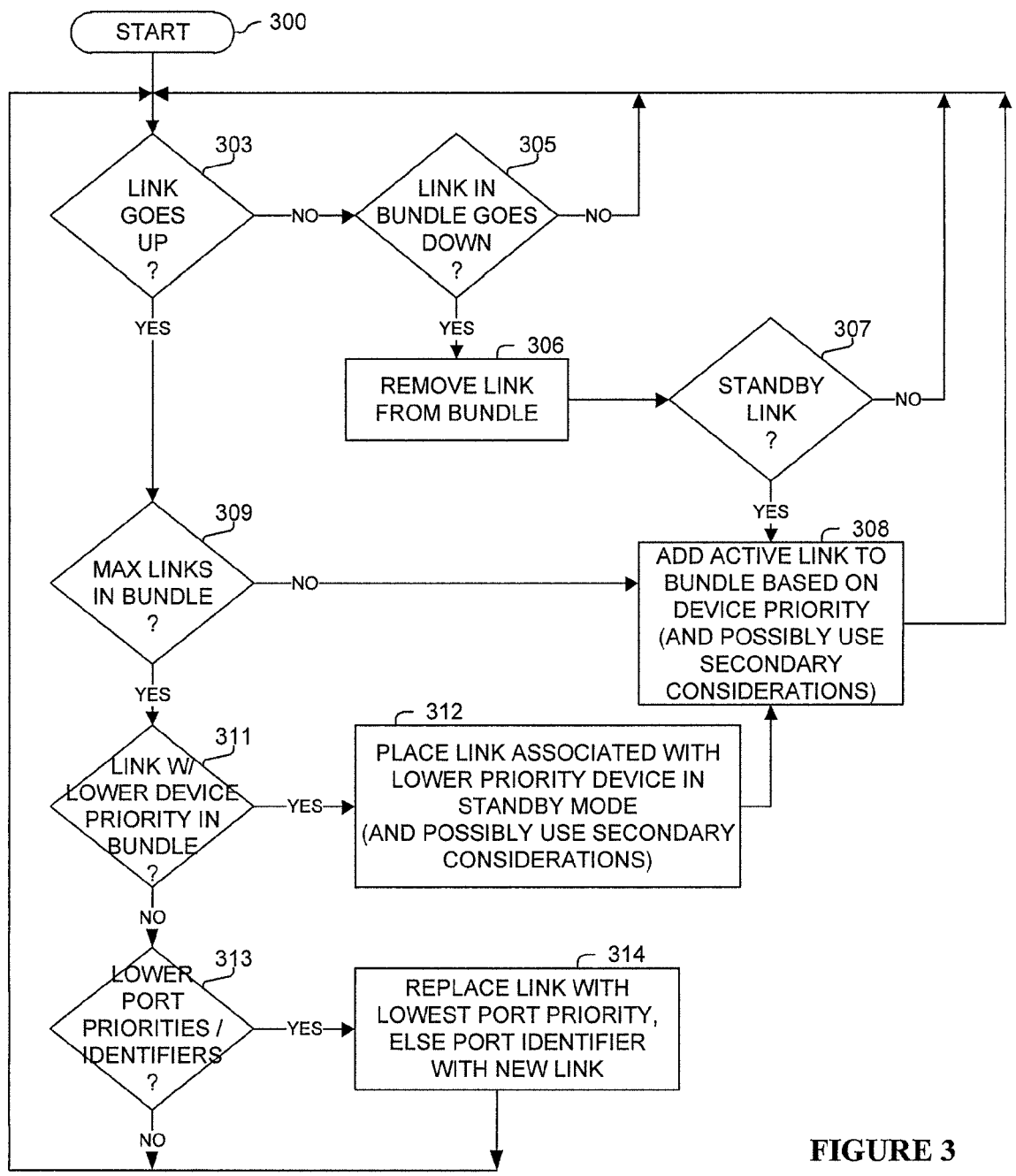
FIG. 3 illustrates a process according to one embodiment.

FIG. 3 illustrates a process for determining on which packet switching device to add an active link to a multichassis bundle as performed in one embodiment. Processing begins with process block 300. Processing loops though process blocks 303 and 305 until a change occurs in the number of links or status of the links of the multichassis bundle.

When an active link currently used in the multichassis bundle goes down as determined in process block 305, then, in process block 306, the link is removed from the multichassis bundle. As determined in process block 307, if there is at least one standby link available for the multichassis bundle (e.g., a non-active link that is available to replace the link that went down), then in process block 308, a link is selected and made active based on the device priorities associated with the devices terminating the multichassis bundle, typically to evenly, or weighted-evenly, distribute the links of the multichassis bundle among the terminating packet switching devices. For example, if all of the devices have the same weight, then one of the devices with the least number of active links of the multichassis bundle associated with it that has a link available to be added to the multichassis bundle (e.g., one in standby mode) will be selected. For example, if the device priorities includes weighted values, then one of the devices will be selected based on the number of active links of the multichassis bundle associated with it and its respective weighted value. If the devices terminating the available standby links are all associated with a same device priority, one embodiment uses secondary determinations (e.g., on port priorities, port identifiers) to determine the particular standby link to make active. Processing returns to loop though process blocks 303 and 305 until a change occurs in the number of links or status of the links of the multichassis bundle.

When a link goes up (e.g., added to the multichassis bundle or otherwise newly available for communicating packets in the multichassis bundle) as determined in process block 303 and the maximum number of active links in the multichassis bundle has not been reached as determined in process block 309, then processing proceeds to process block 308 to add the new up link to the multichassis bundle. Processing returns to loop though process blocks 303 and 305 until a change occurs in the number of links or status of the links of the multichassis bundle.

When a link goes up (e.g., added to the multichassis bundle or otherwise newly available for communicating packets in the multichassis bundle) as determined in process block 303, the maximum number of active links are already active in the multichassis bundle as determined in process block 309, and there is an active link associated with a lower priority device than that of the new link that became available as determined in 311, then a link associated with the lower priority device (possibly determined from the set of active links associated with the lower priority device based on secondary considerations such as port priority, port identifier) is placed in standby mode in process block 312. The new link that became available is made an active link of the multichassis bundle in process block 308. Processing returns to loop though process blocks 303 and 305 until a change occurs in the number of links or status of the links of the multichassis bundle.

In some embodiments, the processing of process block 311 is determined in the context of the link having not been removed from the multichassis bundle. In some embodiments, the processing of process block 311 is instead determined in the context of the link having been removed from the multichassis bundle. For example, assume there are two packet switching devices terminating the multichassis bundle, a first device currently having one active link associated with it, and a second device currently having two active links associated with it, with each of the first and second devices having at least one standby link available as part of the multichassis bundle. In an embodiment evenly distributing links, if process block 311 is considered with the active links in their current state when determining the dynamic priority of each of the first and second devices and a link associated with first device is the link that just became up, then processing will proceed to process block 312 for removing an active link from the second device. However, some embodiments considers the dynamic priority of the first and second devices as if a link had been removed from the second device, and therefore, the first and second devices will be determined not to have different device priorities in the determination of block 311. When a link goes up (e.g., added to the multichassis bundle or otherwise newly available for communicating packets in the multichassis bundle) as determined in process block 303, the maximum number of active links are already active in the multichassis bundle as determined in process block 309, there is not an active link associated with a lower priority device than that of the new link that became available as determined in 311, and there is a link associated with a lower port priority than that of the link that just became available, or if there is not a lower port priority but there is a lower port identifier, then processing proceeds to process block 314. In process block 314, the link identified in process block 313 which has the lower port priority or the lower port identifier, is replaced in the multichassis bundle by the new link. Thus, in one embodiment, the active links of the multichassis bundle can be adjusted within and between devices based on secondary determinations (e.g., on port priorities, port identifiers) when the device priorities of the devices are the same. Processing returns to loop though process blocks 303 and 305 until a change occurs in the number of links or status of the links of the multichassis bundle.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
    adding and removing active links to and from a multichassis link bundle with one side of the multichassis link bundle terminated on a plurality of devices of a multichassis device;
    wherein said adding active links includes selecting which particular device of the plurality of devices to which to add an active link to the multichassis link bundle based on a device priority of each of the plurality of devices; and
    wherein a device priority of a given device is based on a current number of active links associated with the given device;
    wherein the device priority for the given device is based on a weighted value associated with the given device and the current number of active links associated with the given device; and
    wherein at least one of the plurality of devices has a different weighted value than another of the plurality of devices.

2. The method of claim 1, wherein at least said weighted value associated with one of the plurality of devices is greater than one.

3. The method of claim 1, comprising: selecting an identifiable device of the plurality of devices to which to remove an active link from the multichassis link bundle based on the device priority, and in response, removing an active link terminating on the identifiable device from the multichassis link bundle.

4. The method of claim 3, wherein the plurality of devices includes at least three devices.

5. The method of claim 1, wherein said adding and removing active links is performed in a manner to distribute the active links terminating on the plurality of devices in a weighted-even distribution manner across the plurality of devices.

6. The method of claim 1, wherein said adding and removing active links includes, in response to a particular link becoming available to add to the multichassis link bundle:
    identifying a lower device priority active link currently active in the multichassis link bundle, the lower device priority active link being associated with one of the plurality of devices having a lower device priority than a device priority of the device of the plurality of devices currently terminating the particular link;
    removing the lower device priority active link from the multichassis link bundle; and
    adding the particular link to the multichassis link bundle.

7. The method of claim 6, wherein said operation of identifying a lower device priority active link currently active in the multichassis link bundle is performed by considering device priorities as if the lower device priority active link is not active in the multichassis link bundle.

8. The method of claim 1, comprising: selecting an identifiable device of the plurality of devices to which to remove an active link from the multichassis link bundle based on the device priority.

9. The method of claim 1, wherein the plurality of devices includes at least three devices.

10. The method of claim 1, wherein said adding and removing active links is performed in a manner to evenly distribute the active links terminating on the plurality of devices.

11. A method, comprising:
    in response to a particular link becoming available to add to a multichassis link bundle with one side of the multichassis link bundle terminated on a plurality of devices of a multichassis device:
    identifying a lower device priority active link currently included in the multichassis link bundle with the lower device priority active link terminating on one of the plurality of devices having a lower device priority than another of the plurality of devices terminating the particular link;

removing the lower device priority active link from the active links of the multichassis link bundle; and adding the particular link to the active links of multichassis link bundle, wherein a device priority of a link is determined based on a current number of active links associated with a device of the plurality of devices on which the link is terminated;

wherein a device priority of a link is determined based on a current number of active links associated with a particular device of the plurality of devices on which the link is terminated and a weight value associated with the particular device, wherein at least one of the plurality of devices has a different said weighted value than another of the plurality of devices.

12. The method of claim 11, wherein at least the weighted value associated with one of the plurality of devices is greater than one.

13. The method of claim 11, wherein the plurality of devices includes at least three devices.

14. The method of claim 11, wherein said operation of identifying a lower device priority active link currently included in the multichassis link bundle includes considering that the particular link is not active.

15. A multichassis device, comprising:

a plurality of packet switching devices, with each of the plurality of packet switching devices terminating one side of at least one link of a plurality of links, wherein a multichassis link bundle includes the plurality of links; and a main packet switching device terminating each link in the plurality of links, wherein links of the plurality of links are added and removed from the multichassis link bundle based on a device priority associated with each of the plurality of packet switching devices, and the device priority of each particular packet switching device of the plurality of packet switching devices is determined based on a current number of active links associated with said particular packet switching device;

wherein a device priority of a link is determined based on a current number of active links associated with a particular packet switching device of the plurality of packet switching devices on which the link is terminated and a weight value associated with the particular packet switching device, wherein at least one of the plurality of packet switching devices has a different said weighted value than another of the plurality of packet switching devices.

16. The multichassis device of claim 15, wherein said adding and removing active links includes, in response to a particular link becoming available to add to the multichassis link bundle:

identifying a lower device priority active link currently active in the multichassis link bundle, the lower device priority active link being associated with one of the plurality of devices having a lower device priority than a device priority of the device of the plurality of packet switching devices currently terminating the particular link;

removing the lower device priority active link from the multichassis link bundle; and adding the particular link to the multichassis link bundle.

17. The multichassis device of claim 16, wherein said identifying a lower device priority active link currently active in the multichassis link bundle is performed by considering device priorities as if the lower device priority active link is not active in the multichassis link bundle.

18. The multichassis device of claim 15, wherein at least the weighted value associated with one of the plurality of packet switching devices is greater than one.

19. The multichassis device of claim 15, wherein the device priority of each particular packet switching device is determined without the current number of active links being a maximum number of links.

20. The method of claim 1, wherein the device priority for each given device is determined without the current number of active links being a maximum number of links.

21. The method of claim 11, wherein the device priority for the link is determined without the current number of active links being a maximum number of links.

* * * * *